June 23, 1959
H. C. HESS
2,891,451
APPARATUS FOR ROUTING WING SKIN PANELS FOR
AIRCRAFT AND THE LIKE
Filed Nov. 29, 1955
2 Sheets-Sheet 1
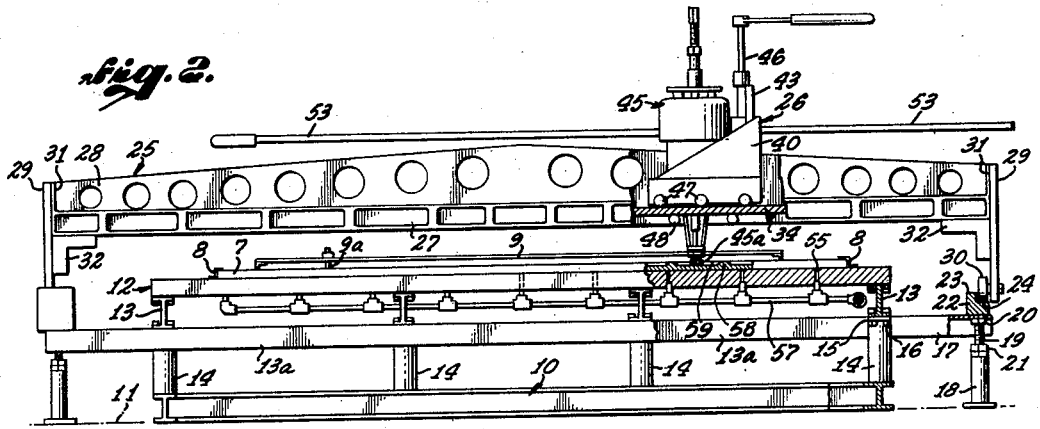
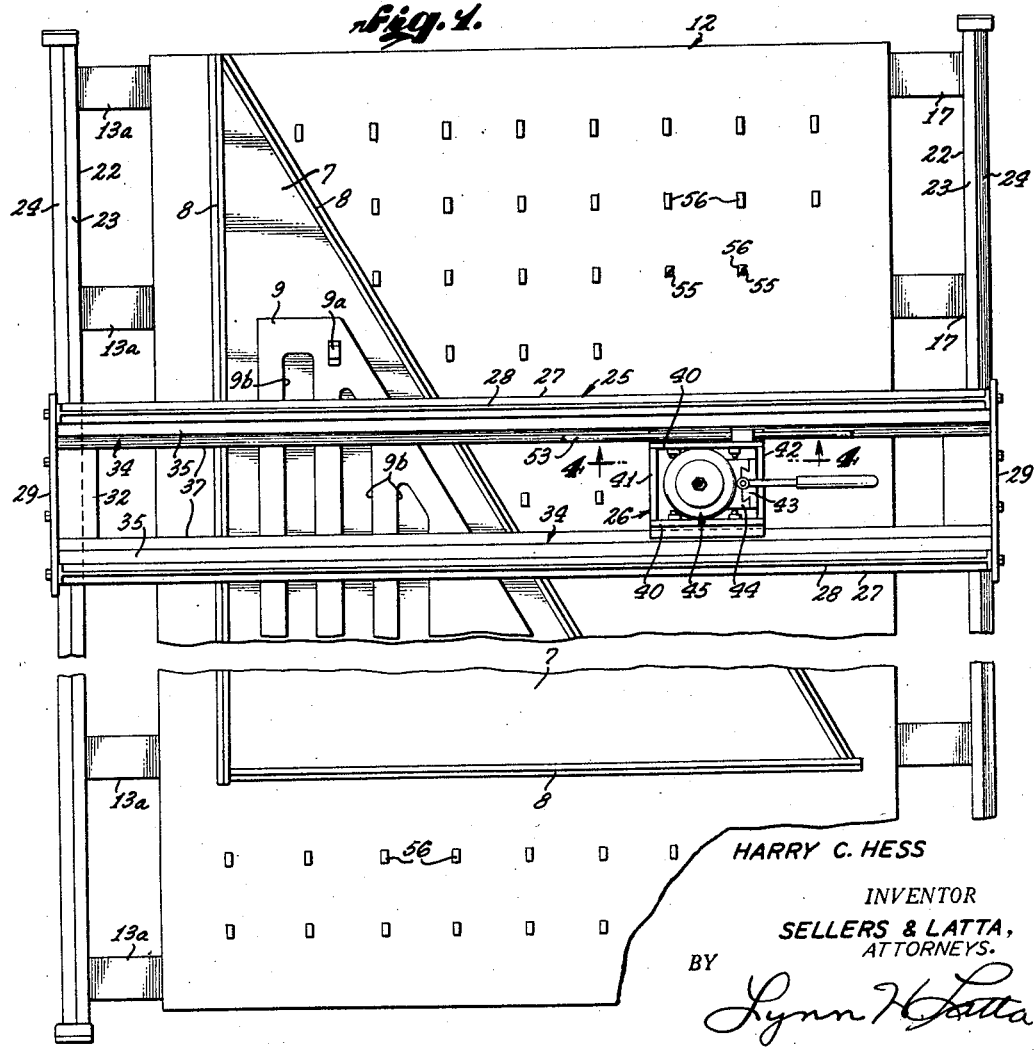
HARRY C. HESS
INVENTOR
SELLERS & LATTA,
ATTORNEYS.
BY June 23, 1959
H. C. HESS
2,891,451
APPARATUS FOR ROUTING WING SKIN PANELS FOR AIRCRAFT AND THE LIKE
Filed Nov. 29, 1955
2 Sheets-Sheet 2
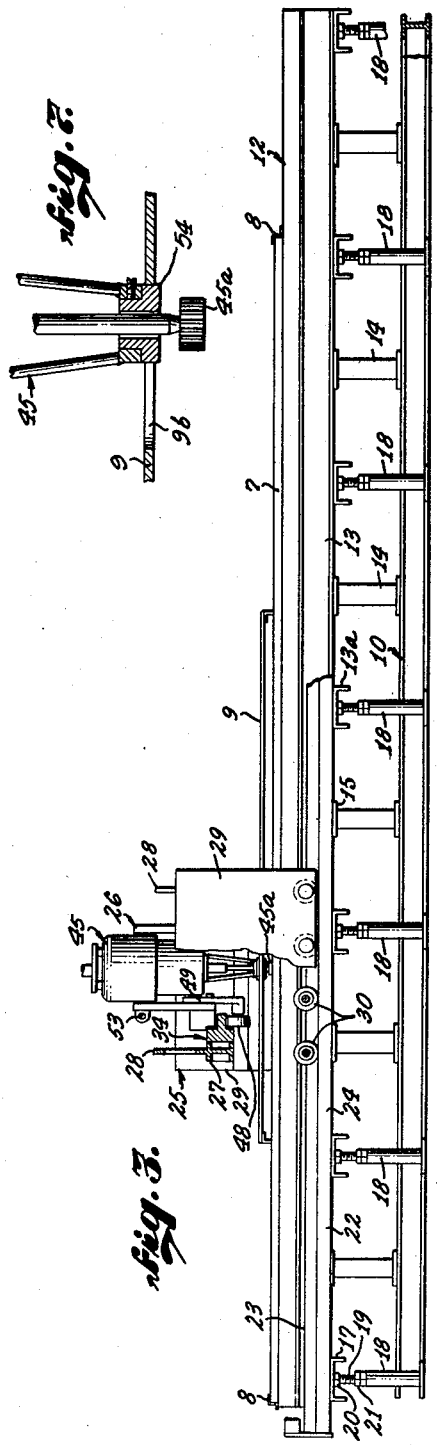
HARRY C. HESS
INVENTOR
BY SELLERS & LATTA,
ATTORNEYS.

United States Patent Office 2,891,451
Patented June 23, 1959

2,891,451

APPARATUS FOR ROUTING WING SKIN PANELS FOR AIRCRAFT AND THE LIKE

Harry C. Hess, Sherman Oaks, Calif.

Application November 29, 1955, Serial No. 549,658

10 Claims. (Cl. 90—13)

This invention relates to the art of machining recesses in a face or faces of a relatively large, thick, work plate, for producing a thickness-contoured article such as a section of wing skin for a high speed jet (e.g. fighter) aircraft. In such aircraft, modern specifications call for an integral component wherein a grid or latticework of reinforcing ribs is integral with a series of thinner webs which constitute the major area of the skin of the aircraft wing as fabricated by attaching several such skin sections to a frame structure. The use of such integrated sections instead of earlier skin components wherein a thin metal sheet of uniform gage was riveted to a series of separately fabricated ribs, has created particularly difficult fabrication problems. To attempt to mold or cast such an integral component would be wholly unsatisfactory because of the impossibility of attaining adequate strength in a cast or molded metal article. On the other hand, conventional machining facilities and methods, although they have been hitherto employed in fabricating such components, have proven extremely expensive and not very accurate.

In general, the invention contemplates an apparatus and method which is based upon the routing principle.

One of the special objects of the invention is to provide a method and apparatus for attaining accuracy in the thickness of the thinner web portions remaining after the metal above such web portions has been routed out. This is attained by providing for exact parallelism between the plane of movement of the routing cutter and the work supporting upper face of a work bed to which the thick work sheet is attached. As one aspect of the solution, the work bed is disposed in a horizontal plane and the plane of cutter movement is correspondingly horizontal.

Provision for movement of a routing cutter in a horizontal plane over an area as large as that of an airplane wing skin section, in itself presents a number of difficult problems. In this connection, one of the specific objects of the invention is to provide a cutter support, mounted for travelling in all directions horizontally over a large area, with the weight of a cutter drive motor and a carriage, all supported by means which is substantially completely free from sag (which, if present, would cause the cutter to dip vertically in traversing the work area, with a corresponding dipping of the line of cut below the straight line path required for keeping the aggregate cut in a flat plane).

Another object is to provide an apparatus in which a cutter, and its drive motor and travelling carriage, are supported for movement which is sufficiently free so that the cutter may be moved by manual effort alone, while being guided in a path dictated by a template.

A problem of major difficulty has been the matter of attaining exact parallelism between the plane of cutter movement and the supporting surface of the work bed. A further object is to provide a novel and improved method of truing the apparatus to easily attain this end.

The invention further deals with the rather difficult problem of holding the large area, thick work plate securely in place while it is being machined, and especially solves the difficult problem of securing the work plate with one face accurately located in a reference plane to which the movements of a cutter tool are related in a manner to obtain extreme accuracy in depth of cut so as to maintain exactly the prescribed thickness of skin web as defined between the bottom of a recess and the opposite face of the work plate.

Other objects will become apparent in the ensuing specifications and appended drawings in which:

Fig. 1 is a fragmentary plan view of a routing apparatus embodying my invention and illustrating my improved method of routing a series of irregular recesses in a work plate;

Fig. 2 is an end view of the same, with parts thereof being shown in transverse section and broken away to better illustrate the construction.

Fig. 3 is a side elevation of the apparatus with parts broken away and shown in section;

Fig. 4 is a fragmentary detail sectional view taken on the line 4—4 of Fig. 1 with parts shown in phantom;

Fig. 5 is a vertical sectional view taken on the line 5—5 of Fig. 4;

Fig. 6 is a vertical sectional view taken on the lines 6—6 of Fig. 4;

Fig. 7 is a detail sectional view of the template-following stylus.

Referring now to the drawings in detail, I have shown as an example of one form in which the apparatus of my invention may be embodied, a routing machine embodying a base frame 10 resting upon a foundation such as a concrete floor 11, and a work supporting bed 12 of heavy cast metal in the form of a thick flat plate, immediately mounted upon a series of structural I beam joists 13 which rest astride a plurality of transverse beams 13a of channel iron, the latter being supported by posts 14. Posts 14 rest upon and are secured as by welding at their lower ends to the base frame 10, the upper ends of posts 14 being provided with flanges 15 which are secured to I beams 13 as by means of bolts 16 extending through the flanges of the I beams as well as the flanges 15.

Cross beams 13a have end portions 17 projecting outwardly beyond the outermost joists 13 and supported upon screw jacks 18 which rest directly upon foundation 11. Each jack 18 embodies a screw shaft 19 threaded into the body thereof, having a squared head 20 to which a wrench may be fitted for rotating the shaft 19, and having a lock nut 21 for locking the screw shaft 19 in any adjusted position thereof. Mounted upon the ends of projecting beam portions 17 and extending longitudinally parallel to the respective sides of bed 12, are a pair of rails 22 each having a vertical retainer flange 23 at its inner side, and a horizontal bearing surface 24 in the form of a shoulder projecting outwardly from the base of flange 23.

A tool carriage supporting bridge 25 is supported by rails 22 for travelling longitudinally along the machine above the work supporting bed 12. A tool carriage 26 is supported by the bridge 25 for movement transversely over bed 12. Bridge 25 comprises a pair of girders each consisting in an I beam 27 having a reinforcing fin 28, of plate metal welded to its upper flange and projecting upwardly therefrom.

At the respective ends of bridge 25, girders 27, 28 are joined by legs 29 in the form of relatively heavy rectangular plates. A plurality of rollers 30 are rotatably mounted to the inner face of each leg 29 at its lower end for travel upon the bearing shoulder 24 of the respective rail 23, the rollers abutting the vertical outer faces of flanges 23 to retain the bridges 27, 28 against shifting transversely of the longitudinal axis of the machine. Legs 29 are suitably secured, as by bolting, to end flanges 31 on girders 27, 28 and are braced by heavy angle brackets 32 secured to the inner faces of legs 29 and to the under side of I beams 27, respectively, brackets 32 extending transversely the full width of bridge 25 and assisting legs 29 in securing the respective girders to one another.

Secured to the inner sides of respective I beams 27 are rails 34 on which the tool carriage 26 travels. Rails 34 are of T-section, each including head flanges 35 and 36 and a lateral flange 37 (Figs. 5 and 6). The attachment of rails 34 to I beams 27 is provided for by screws 38 extending centrally thru the respective rails and threaded into gusset blocks 39 which are welded into the respective sides of I beams 27.

Carriage 26 comprises plates 40 of heavy plate metal in triangular form connected by cross members 41 and 42, the latter providing support for a vertical slide way 43. Mounted for vertical sliding movement on slide way 43 is slide bracket 44 of a tool motor 45. A conventional screw adjustment device 46 operates between slide way 43 and slide bracket 44 to adjust the motor 45 vertically, thus providing vertical adjustment for a routing cutter 45a attached to the lower end of the motor shaft and driven by a motor.

Suitable indicating means may be provided, although not shown, for indicating the tool height above bed 12 thus determining the depth of cut to be taken in any particular stage of operation. Carriage 26 is supported for travelling lengthwise of bridge 25 (transversely of the bed 12) by a plurality of pairs of upper and lower rollers 47 and 48 respectively, rollers 47 being rotatably mounted directly to the outer faces of side plates 40 and rollers 48, being mounted on the lower ends of adjustable bracket arms 49, each having a pair of aligned slots 50 through which mounting screws 51 are extended and threaded into the respective side plates 40 for clamping the bracket arms to the inner faces thereof. Each bracket arm 49 is provided with an adjusting screw 52 which is threaded through its upper end into the upper slot 50 and abuts the upper mounting screw 51. With a mounting screw 51 acting as a fulcrum, the respective adjusting screw 52 may be rotated so as to raise or lower the arm 49.

In effecting adjustment of the rollers 48, they are drawn upwardly just sufficiently to establish contact with the under sides of rail flanges 37 without clamping the rail flange tightly between the pairs of rollers 47, 48. The weight of the motor and the carriage 26 is relied upon to feed the cutter 45a to the full depth determined by the bearing of rollers 37 against rail 34. The adjustment of rollers 48 is loose enough so that carriage 26 may be freely shifted manually. This is effected by handles 53 which are attached to one side of carriage 26 and extend horizontally therefrom and parallel to bridge 25. Correspondingly, the rollers 30 are adapted to travel freely on rails 22 so that the bridge 25 may be bodily shifted longitudinally above bed 12 when manually pushed at either end.

The problem of attaining exact parallelism between the work supporting face of bed 12 and the plane of cutter 45a is solved as follows:

In the original erection of the apparatus, all sub-structure (base 10, posts 14, joists 13 and cross beams 13a) is cut and assembled to the maximum accuracy obtainable through structural engineering skills. Due to inevitable inaccuracies in the foundation surface 11 and in the exact cross sectional dimensions and straightness of the I-beam and channel section material of members 13 and 13a, and inaccuracies in cutting posts 14 to exactly identical lengths, further truing measures are required. Prior to bolting joists 13 down to post flanges 15, bed 12 and rails 22 are levelled to approximate parallelism between the common plane of bearing shoulders 24 and the upper face of bed 12, by snugging the beam ends 17 with screw jacks 18 while periodically surveying the shoulders 24 with a transit until each shoulder 24 is perfectly straight from end to end and exactly horizontal. Shims are inserted between beam ends 17 and rails 22 where necessary, to fill gaps that can not be closed by the screw jack elevation of the beam ends. Bed 12 is then approximately levelled, shims being inserted between post flanges 15 and joists 13 wherever necessary to fill any gaps that may occur between joists 13 and flanges 15.

As the final step of truing the work supporting surface after the rails 22 have been levelled, the bridge 25 and carriage 26 are installed and the cutter 45a is operated to skin off the top surface of bed 12 until the entire area of the bed has been skinned. The skinned surface is then necessarily parallel to the plane of cutter movement, to an exactness such that, in subsequent machining, operations on a work blank, thickness of the skin web remaining after machining, may be kept uniform to within a .001" tolerance.

The problem of avoiding sag in rails 34 is satisfactorily met by utilizing sufficient height in reinforcing fins 28 to reduce the sag to a negigible minimum.

To the lower end of the housing of motor 45 is secured a bracket-mounted template following stylus 54.

*The method*

My improved method of fabricating a ribbed panel member can best be understood by reference to the foregoing description of the apparatus. A work panel member, in process of fabrication, is indicated in the drawing by the reference number 7. In general, the method embraces the following steps:

(1) A solid plate 7 of metal having an adequate overall thickness is placed upon the work bed 12;

(2) The work plate 7 is secured to bed 12 solely by the operation of suction between the lower face of work plate 7 and the upper face of bed 12. I find that where other methods of supporting and holding the work have not been satisfactory, this method will operate satisfactorily for reasons which have been explained.

Work support bed 12 is utilized as a vacuum chuck to grasp the under surface of the work bed 12 is provided with a series of regularly spaced apertures 55 extending through the bed from top to bottom and communicating with a network of suction piping 57 through which suction is applied. All apertures 55 that may be exposed above the area of the work plate 7 are sealed by insertion of set screws therein and then covering the apertures with short lengths of adhesive tape 56 attached to the upper face of bed 12 across the apertures 55. The edges of work plate 7 are sealed to the bed 12 by lengths of adhesive tape 8, applied to the upper face thereof along the margins thereof, and pressed downwardly along the vertical marginal faces and horizontally along the work supporting surface of bed 12 (in Z section form); thus the suction is all concentrated against the under face of the work plate 7 at a large number of fairly closely spaced points, thereby assuring that the entire under face of plate 7 will be engaged in full contact with bed 12, with no gapping at any point under the effect of vibration, temperature changes, or other causes. It will be apparent that this is extremely important in the attainment of accuracy of depth of cut, especially where the web of material remaining at the lower face of a work plate (to provide the smooth continuous outer skin surface of a wing panel or other aerodynamic skin panel) may be reduced to a thickness of no more than .050" as contrasted to a maximum thickness of an inch and a half or two inches in rib 58 between recesses 59.

(3) A template 9 is now attached to the upper face of the work plate 7, being accurately positioned by locating pins 9a extending into specified locating holes in the work. In this connection it may be noted that a few such locating holes are permitted in skin sheet panels and other fabricated panels such as are made for military aircraft, and while I have not found it feasible to utilize such locating holes for securing the work to the supporting bed, they are satisfactory for locating the template 9 accurately in position. Template 9 may have any specified apertures 9b for guiding the stylus in the proper paths to produce the prescribed recesses in the panel to be fabricated.

(4) The cutter 45a is now inserted into one of the apertures 9b of template 9, as by elevating the cutter to clear the upper face of template 9, then shifting the cutter horizontally to the proper position and then lowering the cutter into the aperture.

During the routing operations the work plate 7 is positively held in full contact with bed 12 throughout its entire under face, by application of suction to a large number of uniformly distributed points on the under face of work plate 7. This application of downward pull to work plate 7 is such to avoid any tendency of the work plate to gap away from the bed 12 at any point under the effect of vibration, temperature change or other cause. The upper face of bed 12 is maintained perfectly flat and parallel to the plane of the supports of bridge 25 and carriage 26 so as to obtain exact parallelism between the plane of the cutter movements and the plane of the work supporting face. Thus it is possible to machine a series of recesses 59 in the upper side of work plate 7 which collectively define at the lower side of the work plate a relatively thin web which becomes the outer surface skin of an aerodynamic skin panel, and which meet all requirements for accurate uniformity of thickness.

(5) The cutter having been inserted into an aperture 9" of the template, the stylus 54 is brought into engagement with the margin of the aperture 9" and caused to slide along said margin, moving the cutter so as to thus produce a cut in the work 7 corresponding to said margin. If the aperture 9" is such as to call for a cut longitudinally of bed 12, the necessary translational movement of the cutter 45a is accomplished by rolling bridge 25 along rails 22. If a transverse cut is called for, the necessary movement of cutter 45a is accomplished by rolling carriage 26 along rails 34 of bridge 25. Diagonal or circular movements of the cutter are provided for by combined movements of both bridge 25 and carriage 26 simultaneously. All movements are produced by manual efforts of operators, grasping the respective ends of bridge 25 for moving the latter, and grasping handles 53 for moving carriage 26. The carriage is passed back and forth between the two operators as it is moved from side to side of the bed, the handles having an aggregate length substantially spanning the width of the bed when the carriage is midway between the sides of the bed, so that the handles, in that position, are within the reach of both operators. Operators stand at both ends of bridge 25, i.e. at both sides of the machine, and work in concert to move the cutter along the paths guided by template 9. By having the bridge 25 and a carriage 26 respectively mounted for exact horizontal movements, and providing anti-friction supports for these units, the cutter can be moved with moderate effort and can be easily guided in full contact continuously with the guiding margins of template 9, thus producing exactly accurate contours for the specified recesses in the work plate 7. Furthermore, the guiding of carriage 26 and bridge 25 may be slightly loose (so as to avoid resistance to movement) without causing the cutter to deviate from an accurate horizontal plane or to deviate from the marginal contours of template 9 since all that is necessary for accuracy in the latter respect is to maintain the two in full contact with the template margins.

I claim:

1. A large scale routing machine for machining a series of recesses of specified design and depth in one side of a thick work plate, to produce a one-piece panel with relatively thin skin web sections integrally joined to a much thicker grid structure of reinforcing ribs, with an aggregate area comparable to that of a major area of an airplane wing, said machine comprising: a bed of area larger than said panel area, having a flat horizontal work supporting upper surface and having parallel side margins; a pair of longitudinal rails extending in parallel, horizontally spaced relation to said side margins, in outboard relation thereto, said rails having bearing surfaces parallel to said work supporting surface; a bridge disposed transversely above and spanning said bed and having at its respective ends, supporting rollers travelling on said bearing surfaces of the rails, said bridge embodying spaced transverse horizontal rails, parallel to said work supporting surface, and means for supporting said rails against any sagging deviation from true straightness; a carriage having rollers travelling on said rails; a cutter driving motor supported on said carriage and having a driven shaft projecting downwardly therebelow on a vertical axis; a cutter on the lower end of said shaft; means mounting said motor in said carriage for vertical adjustment therein; a plurality of transverse beams having intermediate portions in supporting relation to said bed and having end portions projecting beyond the side margins of said bed, said longitudinal rails being supported upon the ends of said transverse beams; and a plurality of screw jacks in supporting engagement with the end portions of said transverse beams and adjustable vertically for leveling said longitudinal rails with reference to said bed.

2. A large scale routing machine for machining a series of recesses of specified design and depth in one side of a thick work plate, to produce a one piece panel with relatively thin skin web sections integrally joined to a much thicker grid structure of reinforcing ribs, with an aggregate area comparable to that of a major area of an airplane, said machine comprising: a bed of area larger than said panel area, having a flat horizontal work supporting upper surface and having parallel side margins; a plurality of transverse beams having intermediate portions in supporting relation to said bed and having end portions projecting beyond the side margins of said bed; a pair of longitudinal rails extending in parallel, laterally spaced outboard relation to said side margins of the bed, seated on the upper faces of said beam end portions and having upper bearing surfaces exactly parallel to said work supporting surface and below the level thereof; a bridge disposed transversely above and extending beyond said side margins of said bed and having at its respective ends, supporting rollers traveling on said bearing surfaces of said longitudinal rails, said bridge embodying spaced transverse horizontal rails, exactly parallel to said work supporting surface; a carriage having rollers traveling on said transverse rails; a motor driven routing cutter supported on a vertical rotational axis for vertical adjustment in said carriage; and shaft handles secured to said carriage and extending parallel to said bridge, said handles having an aggregate length sufficient to span the width of the bed when the carriage is in a position midway between the sides of the bed, such shaft handles being disposerd above and adjacent said bridge whereby a pair of operators may simultaneously manually shift said bridge and carriage to cause said tool to follow a selected path in two dimensions horizontally; said bed having a plurality of suction apertures opening into said work supporting surface and including means for applying suction to said apertures to secure a work plate against said supporting surface.

3. A large scale routing machine for machining a series of recesses of specified design and depth in one side of a thick work plate, to produce a one piece panel with relatively thin skin web sections integrally joined to a much thicker grid structure of reinforcing ribs, with an aggregate area comparable to that of a major area of an airplane, said machine comprising: a bed of area larger than said panel area, having a flat horizontal work supporting upper surface and having parallel side margins, said bed having a plurality of suction apertures opening into said work supporting surface and being provided with means for applying suction to said aperture for securing a work plate against said supporting surface; a plurality of parallel, laterally spaced joists extending full length beneath said bed and supporting the same; a plurality of longitudinally spaced transverse beams having intermediate portions in supporting contact with the under sides of said joists and having end portions projecting beyond the side margins of said bed; a pair of longitudinal rails supported upon the upper faces of the end portions of said transverse beams below the level of said work supporting surface, said rails having upper bearing surfaces exactly parallel to said work supporting surface; a plurality of vertical posts in supporting engagement with the undersides of said longitudinal beams at transversely spaced points; means in supporting engagement with the under sides of the end portions of said transverse beams for maintaining the parallel relation of said longitudinal rails with reference to said bed; a bridge disposed transversely above and spanning said bed and extending beyond the side margins thereof, said bridge embodying spaced transverse horizontal rails, truss means above said rails and attached thereto so as to brace them against sagging, arms extending downwardly from the ends of said rails, and rollers journalled on the lower ends of said arms and traveling on said bearing surfaces of the longitudinal rails; and a carriage having rollers traveling on said transverse rails.

4. A large scale routing machine for machining a series of recesses of specified design and depth in one side of a thick work plate, to produce a one-piece panel with relatively thin skin web sections integrally joined to a much thicker grid structure of reinforcing ribs, with an aggregate area comparable to that of a major area of an airplane, said machine comprising: a bed of area larger than said panel area, having a flat horizontal work supporting upper surface; a plurality of transverse beams having intermediate portions in supporting relation to said bed and having end portions projecting beyond the side margins of said bed; means providing support for said transverse beams beneath said bed; a pair of longitudinal rails extending in laterally spaced outboard relation to said side margins of the bed, supported upon the outer ends of said beams and having upper bearing surfaces exactly parallel to said work supporting surface; a bridge disposed transversely above and extending beyond said side margins of the bed and having at its respective ends supporting rollers travelling on said bearing surfaces of said longitudinal rails, said bridge embodying spaced transverse horizontal rails, parallel to said work supporting surface, and means for supporting said transverse rails against sagging; a carriage having rollers travelling on said transverse rails; a motor driven routing cutter supported on a vertical rotational axis for a vertical adjustment in said carriage; and a plurality of supporting devices independently supporting the outer ends of said transverse beams and adjustable vertically for levelling said longitudinal rails with reference to said bed.

5. A large scale routing machine for machining a series of recesses of specified design and depth in one side of a thick work plate, to produce a one piece panel with relatively thin skin web sections integrally joined to a much thicker grid structure of reinforcing ribs, with an aggregate area comparable to that of a major area of an airplane, said machine comprising: a bed of area larger than said panel area, having a flat horizontal work supporting upper surface; a plurality of transverse beams having intermediate portions in supporting relation to said bed and having end portions projecting beyond the side margins of said bed; a pair of longitudinal rails extending in parallel, laterally spaced outboard relation to said side margins of the bed, supported on the ends of said projecting beam portions and having upper bearing surfaces parallel to said work supporting surface and below the level thereof; a bridge disposed transversely above and extending beyond said side margins of said bed and having at its respective ends, said bridge embodying spaced transverse horizontal rails, parallel to said work supporting surface, and means for supporting said transverse rails in a horizontal plane, including legs secured to the ends of said transverse rails and extending downwardly therefrom and having rollers journalled on the lower ends of said legs and traveling on said upper bearing surfaces of said longitudinal rails; a carriage having rollers travelling on said transverse rails; a motor driven routing cutter supported on a vertical rotational axis for vertical adjustment in said carriage; and shaft handles secured to said carriage and extending parallel to said bridge, said handles having an aggregate length sufficient to span the width of the bed when the carriage is in a position midway between the sides of the bed, such shaft handles being disposed above and adjacent said bridge whereby a pair of operators may simultaneously manually shift said bridge and carriage to cause said tool to follow a selected two-dimensional path in a horizontal plane.

6. A routing machine as defined in claim 4, including a base frame beneath and substantially conforming to the outline of said bed; posts secured to said base frame and extending upwardly therefrom; and a plurality of laterally spaced longitudinally extending joists supported upon said posts and in immediate supporting engagement with said bed.

7. A large scale routing machine for machining a series of recesses of specified design and depth in one side of a thick work plate, to produce a one-piece panel with relatively thin skin web sections integrally joined to a much thicker grid structure of reinforcing ribs, with an aggregate area comparable to that of a major area of an airplane, said machine comprising: a bed of area larger than said panel area, having a flat horizontal work supporting upper surface; a pair of longitudinal rails; means supporting said rails in laterally spaced outboard relation to the side margins of said bed, said rails having upper bearing surfaces exactly parallel to and below the level of said work supporting surface; a bridge disposed transversely above and extending beyond said side margins of the bed, said bridge including legs projecting downwardly from its respective ends, supporting rollers journalled on the lower ends of said legs and traveling on said bearing surfaces of said longitudinal rails, said bridge further including spaced transverse horizontal rails, each including a horizontal flange having bearing surfaces on both upper and lower horizontal faces thereof, and a vertical reinforcing flange, said bridge further including means for supporting said transverse rails against sagging; a carriage having upper and lower vertical rollers journalled on respective sides thereof and bearing on said upper and lower bearing faces of said transverse rails, and brackets attached to said respective sides of the carriage for vertical adjustment and projecting downwardly, the lower rollers being journalled on the lower ends of the respective brackets; and a motor driven routing cutter supported on a vertical rotational axis for vertical adjustment in said carriage.

8. A routing machine as defined in claim 7, wherein said carriage further includes lateral guide rollers journalled on said carriage sides on vertical axes and projecting horizontally into bearing engagement with said vertical flange to guide said carriage against shifting laterally of said bridge while traveling on said transverse rails.

9. A large scale routing machine for machining a series of recesses of specified design and depth in one side of a thick work plate, to produce a one-piece panel with relatively thin skin web sections integrally joined to a much thicker grid structure of reinforcing ribs, with an aggregate area comparable to that of a major area of an airplane, said machine comprising: a bed of area larger than said panel area, having a flat horizontal work supporting upper surface; a plurality of transverse beams having intermediate portions in supporting relation to said bed and having end portions projecting beyond the side margins of said bed; means providing support for said transverse beams beneath said bed; a pair of longitudinal rails extending in laterally spaced outboard relation to said side margins of the bed, supported upon the outer ends of said beams and having upper bearing surfaces parallel to and below the level of said work supporting surface; a bridge disposed transversely above and extending beyond said side margins of the bed, said bridge embodying spaced transverse rails, and means for supporting said transverse rails in a horizontal plane parallel to said work supporting surface, said supporting means comprising a pair of legs each secured to, bridging between and bracing the ends of said transverse rails at a respective end of said bridge and extending downwardly, and a pair of rollers journalled to the lower end of each of said legs and traveling on said bearing surfaces of said longitudinal rails; a carriage having rollers traveling on said transverse rails; and a motor driven routing cutter supported on a vertical rotational axis for vertical adjustment in said carriage.

10. A routing machine as defined in claim 9, wherein said longitudinal rails are of L-section each including a horizontal body portion having said upper bearing surface and a vertical flange projecting upwardly from the inner side of said horizontal portion and providing a guide for restraining transverse shifting of the supporting rollers traveling on said supporting surface.

References Cited in the file of this patent

UNITED STATES PATENTS

| | | |
|---|---|---|
| 1,723,106 | Wiglenda | Aug. 6, 1929 |
| 2,348,145 | Perkins | May 2, 1944 |
| 2,451,783 | Sweeney | Oct. 19, 1948 |
| 2,622,871 | Martin | Dec. 23, 1952 |
| 2,693,737 | Smith | Nov. 9, 1954 |
| 2,730,020 | Pollock et al. | Jan. 10, 1956 |
| 2,767,458 | Meier | Oct. 23, 1956 |
| 2,774,642 | Waller | Dec. 18, 1956 |
| 2,782,574 | Copold | Feb. 26, 1957 |